(12) United States Patent
Aizawa et al.

(10) Patent No.: US 11,186,242 B2
(45) Date of Patent: Nov. 30, 2021

(54) ENERGY ABSORPTION MEMBER AND ENERGY ABSORPTION STRUCTURE

(71) Applicant: HONDA MOTOR CO., LTD., Tokyo (JP)

(72) Inventors: Teruaki Aizawa, Wako (JP); Tatsuya Ishizaki, Wako (JP); Hiroyuki Midorikawa, Wako (JP); Masaki Umezawa, Wako (JP); Akira Hojo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 16/788,548

(22) Filed: Feb. 12, 2020

(65) Prior Publication Data

US 2020/0262370 A1 Aug. 20, 2020

(30) Foreign Application Priority Data

Feb. 15, 2019 (JP) .............................. JP2019-026010

(51) Int. Cl.
*B60J 7/00* (2006.01)
*B60R 19/02* (2006.01)

(52) U.S. Cl.
CPC .................................. *B60R 19/023* (2013.01)

(58) Field of Classification Search
CPC ... B60R 19/34; B60R 19/18; B60R 2019/186; B60R 2019/1873; B62D 21/152; C07C 45/673; C07C 407/00; C07C 409/04; C07C 45/49; A61B 6/482
See application file for complete search history.

(56) References Cited

U.S. PATENT DOCUMENTS

| 4,460,206 | A | * | 7/1984 | Peter | B60R 19/26 293/120 |
| 5,106,137 | A | * | 4/1992 | Curtis | B60R 19/20 293/107 |
| 5,393,111 | A | * | 2/1995 | Eipper | B60R 19/22 293/109 |
| 9,878,687 | B2 | * | 1/2018 | Du | B60R 19/18 |
| 2003/0047952 | A1 | * | 3/2003 | Trappe | B60R 19/18 293/120 |

(Continued)

FOREIGN PATENT DOCUMENTS

| JP | 2006-111044 A | 4/2006 |
| JP | 2006-123679 A | 5/2006 |

(Continued)

OTHER PUBLICATIONS

Office Action received in corresponding Japanese application No. 2019-026010 dated Jul. 28, 2020 with English translation (10 pages).

*Primary Examiner* — Kiran B Patel
(74) *Attorney, Agent, or Firm* — Rankin, Hill & Clark LLP (57) ABSTRACT

Provided is an energy absorption member including a plate shaped rear wall portion which extends in a vehicle width direction; and an extension wall portion that extends in the vehicle width direction and extends forward from an intermediate part in a height direction of the rear wall portion; wherein the rear wall portion takes on an arch shape that projects forward in a plan view, and the extension wall portion is inclined downward or upward from its rear end part toward its front end part.

12 Claims, 6 Drawing Sheets

(56) References Cited

U.S. PATENT DOCUMENTS

| | | | | |
|---|---|---|---|---|
| 2003/0141728 | A1* | 7/2003 | Arvelo | B60R 19/18 |
| | | | | 293/133 |
| 2006/0028037 | A1* | 2/2006 | Kashiwagi | B60R 19/18 |
| | | | | 293/120 |
| 2006/0145490 | A1* | 7/2006 | Yamaguchi | B60R 21/04 |
| | | | | 293/109 |
| 2008/0012364 | A1* | 1/2008 | Boggess | F16F 7/122 |
| | | | | 293/120 |
| 2012/0153643 | A1* | 6/2012 | Mana | B60R 19/18 |
| | | | | 293/120 |
| 2013/0221691 | A1 | 8/2013 | Nagwanshi et al. | |
| 2017/0274850 | A1* | 9/2017 | Aizawa | B60R 19/483 |
| 2020/0094759 | A1* | 3/2020 | Tanabe | B60R 19/24 |
| 2020/0094879 | A1* | 3/2020 | Tanabe | B60R 19/18 |
| 2020/0262376 | A1* | 8/2020 | Aizawa | B60R 19/483 |
| 2020/0276952 | A1* | 9/2020 | Aizawa | B60R 21/0136 |

FOREIGN PATENT DOCUMENTS

| | | |
|---|---|---|
| JP | 2014-505629 A | 3/2014 |
| JP | 2016-016747 A | 2/2016 |
| JP | 2016-078563 A | 5/2016 |
| WO | 2012/113362 A1 | 8/2012 |

\* cited by examiner

ENERGY ABSORPTION MEMBER AND ENERGY ABSORPTION STRUCTURE

CROSS-REFERENCE TO RELATED APPLICATION

This application is based upon and claims priority from the Japanese Patent Application No. 2019-026010, filed on Feb. 15, 2019, the entire contents of which are incorporated herein by reference.

BACKGROUND OF THE INVENTION

Field of the Invention

The present invention is related to an energy absorption member and an energy absorption structure for a vehicle.

Description of the Related Art

Japanese Translation of PCT patent application No. 2014-505629 discloses, as an example of a structure for absorbing the front collision load of a vehicle, a structure in which a foam body is arranged in front of a bumper beam, and a tube extending in the vehicle width direction is arranged between the bumper beam and the foam body, or, more specifically, in a recessed part formed on a rear side of the foam body.

SUMMARY OF THE INVENTION

In the structure disclosed in Japanese Translation of PCT patent application No. 2014-505629, the size of the foam body in the front-rear direction is determined by the sum of the length of the foam body required for absorbing energy and the length of the foam body which is left undeformed after absorbing the energy. Thus, there is a problem in the structure disclosed in Japanese Translation of PCT patent application No. 2014-505629 that the structure can not be downsized in the front-rear direction.

The present invention has been made in view of the above-described problem, and an object thereof is to provide an energy absorption member and an energy absorption structure which allows to make the size of the energy absorption structure in the front-rear direction decreased while the amount of the energy absorbed in the case of the front collision is maintained.

Means to Solve the Problem

To solve the aforementioned problem, an energy absorption member of the present invention includes a plate shaped rear wall portion which extends in a vehicle width direction; and an extension wall portion that extends in the vehicle width direction and extends forward from an intermediate part in a height direction of the rear wall portion; wherein the rear wall portion takes on an arch shape that projects forward in a plan view, and the extension wall portion is inclined downward or upward from its rear end part toward its front end part.

In accordance with the present invention, as the extension wall portion develops the out-of-plane deformation in case of a front collision, it is possible to make the size of the energy absorption structure in the front-rear direction decreased while the amount of the energy to be absorbed in the case of the front collision is maintained.

DETAILED DESCRIPTION OF THE EMBODIMENTS

Regarding an embodiment of the present invention, an energy absorption member and an energy absorption structure of the present invention will be described below in detail with reference to the accompanying drawings while taking a case of applying the energy absorption member and the energy absorption structure for absorbing energy of a collision with a pedestrian to a front bumper of a vehicle as an example. In the following description, the same constituents will be denoted by the same reference signs and overlapping explanations thereof will be omitted. Moreover, expressions representing directions such as front, rear, up, down, right, and left will be based on an occupant of a vehicle.

Figure 1:
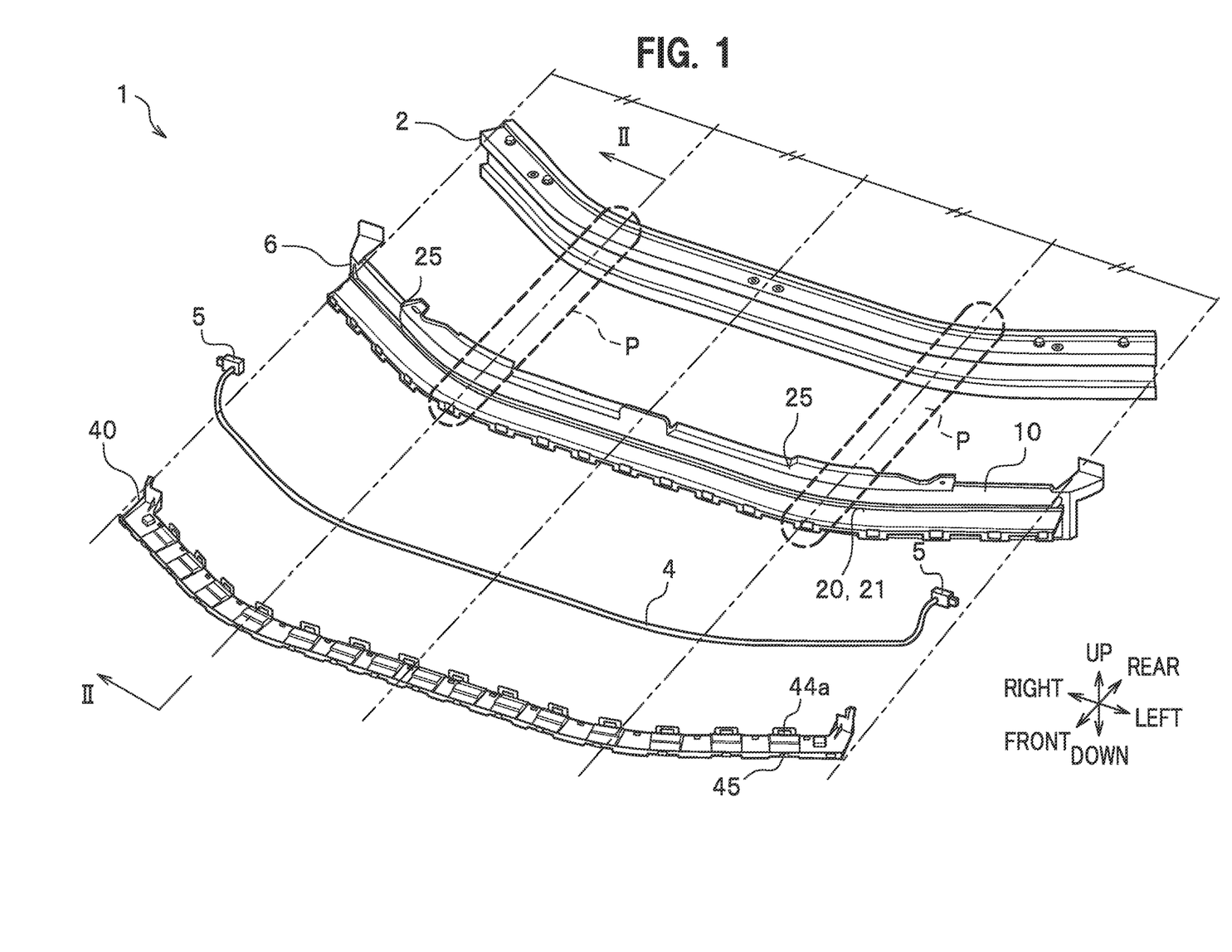
FIG. 1 is an exploded perspective view schematically showing a vehicle front part structure according to an embodiment of the present invention.
Figure 2:
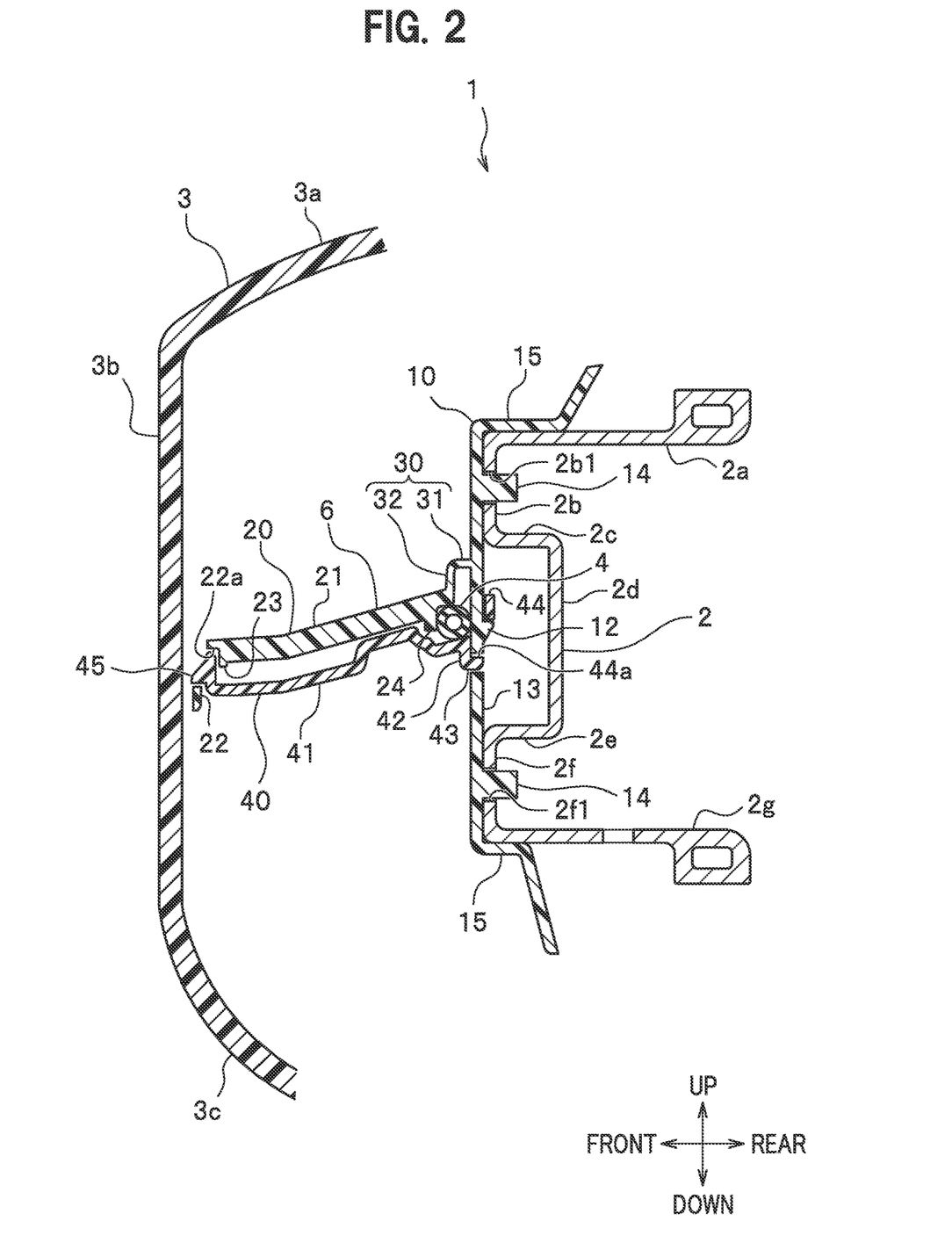
FIG. 2 is a cross-sectional view taken along the II-II line, which schematically shows the vehicle front part structure according to the embodiment of the present invention.

As shown in FIG.1, a vehicle front part structure 1 according to an embodiment of the present invention is a structure designed to absorb collision energy in case a colliding object (such as a pedestrian) collides against a front part of a vehicle, for example, and also to detect the collision. As shown in FIGS. 1 and 2, the vehicle front part structure 1 is provided between a bumper beam 2 and a bumper face 3 of the vehicle front part, and includes a pressure generation tube 4 that extends in a vehicle width direction, a pair of right and left pressure sensors 5 connected to the pressure generation tube 4, an energy absorption member 6, and a reinforcement member 40. Here, the vehicle front part structure 1 includes a first energy absorption structure and a second energy absorption structure collectively as a structure for absorbing collision energy in case a colliding object (such as a pedestrian) collides against the front part of the vehicle, for example. The first energy absorption structure includes the energy absorption member 6 and the bumper beam 2 and prevents a displacement in an up-down direction of these components. The second energy absorption structure includes the energy absorption member 6 and the reinforcement member 40 and increases an amount of energy absorption by using the reinforcement member 40. Moreover, the second energy absorption structure also includes the pressure generation tube 4 and the pressure sensors 5 and detects a collision. Here, the second energy absorption structure further includes sensor attachment structures 1A to be described later.

<Bumper Beam>

The bumper beam 2 is a metallic component that extends in the vehicle width direction at the vehicle front part. The bumper beam 2 takes on an arch shape that projects forward in plan view. Specifically, the bumper beam 2 takes on such a shape that its central part in the vehicle width direction is located foremost and its two end parts in the vehicle width direction gradually set back. The two end parts in the vehicle width direction of the bumper beam 2 are connected to a framework member (a front side member) of the vehicle that extends in a front-rear direction on a rear side of the bumper beam 2. In case of a collision (a front collision) of the vehicle, the bumper beam 2 transmits a collision load (energy) inputted to the bumper beam to the framework member.

As shown in FIG. 2, the bumper beam 2 includes an upper wall portion 2a that extends in the front-rear direction, a front wall portion 2b that extends downward from a front end part of the upper wall portion 2a, and an intermediate upper wall portion 2c that extends rearward from a lower end part of the front wall portion 2b, which are integrated together in lateral view. Moreover, the bumper beam 2 includes an intermediate front wall portion 2d that extends downward from a rear end part of the intermediate upper wall portion 2c, an intermediate lower wall portion 2e that extends forward from a lower end part of the intermediate front wall portion 2d, a front wall portion 2f that extends downward from a front end part of the intermediate lower wall portion 2e, and a lower wall portion 2g that extends rearward from a lower end part of the front wall portion 2f, which are integrated together in lateral view.

Specifically, a concave portion is formed in a front surface of the bumper beam 2 by using the intermediate upper wall portion 2c, the intermediate front wall portion 2d, and the intermediate lower wall portion 2e. The pressure generation tube 4 as well as a tube compressing portion 20 and the reinforcement member 40 of the energy absorption member 6 to be described later are located in front of this concave portion so as to facilitate assembly and disassembly thereof. Meanwhile, hole portions 2b1 and 2f1 are formed in the upper and lower front wall portions 2b and 2f, respectively.

<Bumper Face>

The bumper face 3 is either a resin component or a metallic component which is provided in front of the bumper beam 2 and constitutes an external surface (a design surface) of the vehicle. The bumper face 3 includes an upper wall portion 3a that extends in the front-rear direction, a front wall portion 3b that extends downward from a front end part of the upper wall portion 3a, and a lower wall portion 3c that extends rearward from a lower end part of the front wall portion 3b, which are integrated together in lateral view.

<Pressure Generation Tube>

The pressure generation tube 4 extends in the vehicle width direction between the bumper beam 2 and the bumper face 3. The pressure generation tube 4 is a flexible resin component which generates a pressure in a fluid (such as air) inside when the pressure generation tube 4 is compressed and squashed by a load.

<Pressure Sensor>

As shown in FIG. 1, the pair of right and left pressure sensors 5 are connected to the two end parts of the pressure generation tube 4, respectively. Each pressure sensor 5 detects the pressure of the internal fluid generated by a squash deformation of the pressure generation tube 4 and outputs a detection result to a control unit (not shown). The control unit executes control for protecting the colliding object (such as a pedestrian) by lifting up a hood on an engine room provided at the front part of the vehicle, for instance, based on the detection results of the pair of right and left pressure sensors 5.

<Energy Absorption Member>

The energy absorption member 6 is a resin component (made of polypropylene (PP), for example) provided between the bumper beam 2 and bumper face 3. The energy absorption member 6 is formed by injection molding, for instance, and is rigid enough for not causing a delay in detecting a collision. In case of a collision (a front collision) of the vehicle, the energy absorption member 6 absorbs a front collision load (energy) and compresses the pressure generation tube 4 so as to apply the pressure to the fluid inside the pressure generation tube 4. As shown in FIG. 2, the energy absorption member 6 includes a rear wall portion 10, the tube compressing portion 20, and a hinge portion 30, which are integrated together.

<<Rear Wall Portion>>

Figure 3:
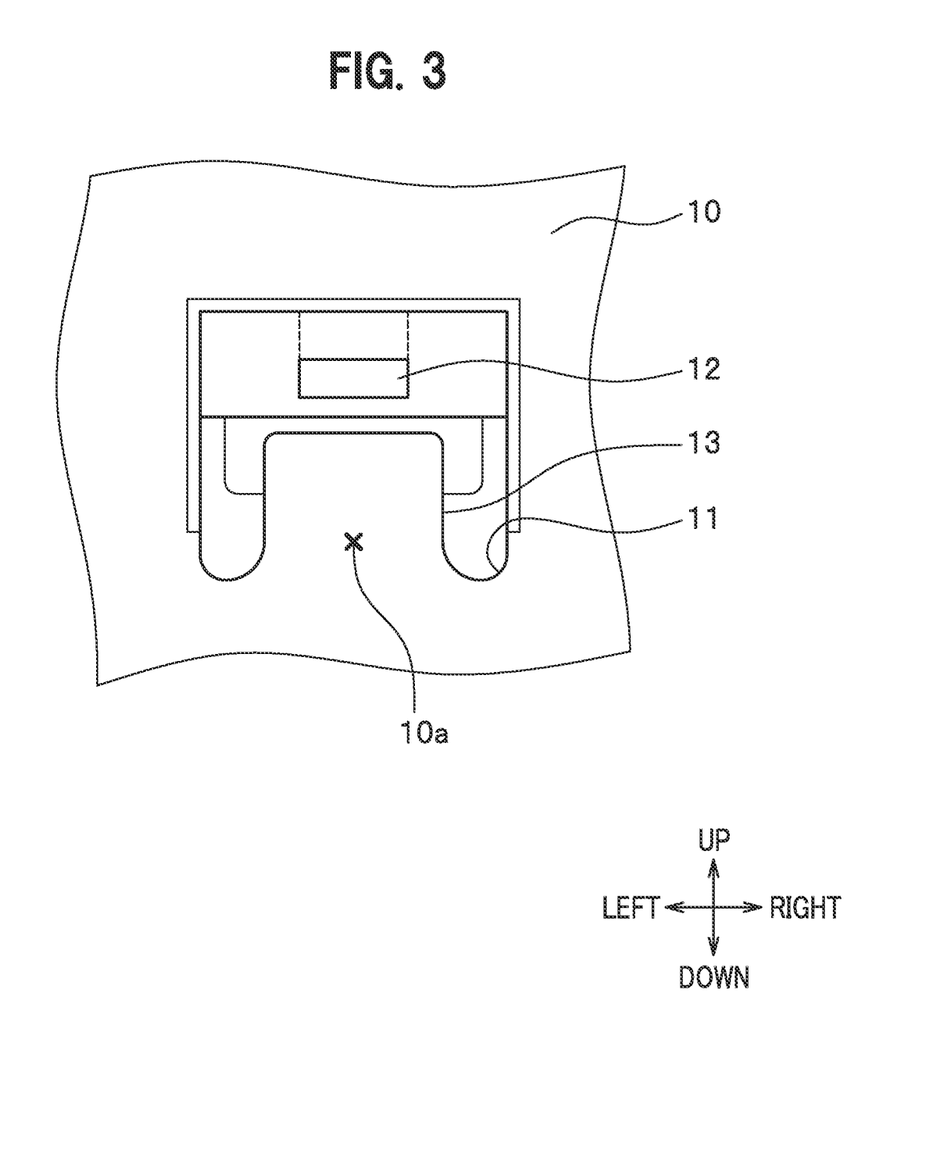
FIG. 3 is a rear view schematically showing a rear wall portion.

The rear wall portion 10 is an elongated plate portion which is located behind the pressure generation tube 4 and extends in the up-down direction and a right-left direction (that is, extends in a direction of a frontal plane). As shown in FIG. 1, the rear wall portion 10 takes on an arch shape that projects forward in plan view in such a way as to extend along the bumper beam 2. Specifically, the rear wall portion 10 takes on such a shape that its central part in the vehicle width direction is located foremost and its two end parts in the vehicle width direction gradually set back. As shown in FIG. 3, combinations each including a hole portion 11 that takes on a rectangular shape, a lock portion 12 that extends downward from an upper edge part of the hole portion 11, and a fall preventing portion 13 that extends upward from a lower edge part of the hole portion 11, are formed in arrangement in the vehicle width direction on the rear wall portion 10. The lock portion 12 takes on a claw shape that can be locked with a peripheral part of a hole portion 44a to be described later. The fall preventing portion 13 takes on a tongue-piece shape that extends upward from an intermediate part 10a while leaving spaces at two ends of the lower edge part of the hole portion 11.

As shown in FIG. 2, pairs of upper and lower projections 14 are formed on the rear wall portion 10. Each projection 14 projects rearward from the rear wall portion 10. The upper projection 14 is inserted into the hole portion 2b1 formed in the front wall portion 2b of the bumper beam 2. The lower projection 14 is inserted into the hole portion 2f1 formed in the front wall portion 2f of the bumper beam 2. Of a combination of a dimension in the up-down direction of the upper projection 14 and a dimension in the up-down direction of the corresponding hole portion 2b1 and a combination of a dimension in the up-down direction of the lower projection 14 and a dimension in the up-down direction of the corresponding hole portion 2f1, at least one of the combinations has the equal dimensions in the up-down direction.

The set of the projection 14 and the hole portion 2b1 (or the hole portion 2f1) is provided between the central part in the vehicle width direction and the corresponding end part in the vehicle width direction of the bumper beam 2, and functions as a vertical displacement preventing portion that prevents a displacement between the energy absorption member 6 and the bumper beam 2 in the up-down direction. Moreover, the set of the projection 14 and the hole portion 2b1 (or the hole portion 2f1) also functions as a positioning portion that positions the energy absorption member 6 relative to the bumper beam 2 at the time of attaching the energy absorption member 6 to the bumper beam 2.

In this embodiment, the projection 14 and the hole portion 2b1 (or the hole portion 2f1) collectively serving as the vertical displacement preventing portion are provided in a region P (see FIG. 1) located at a distance of about ¼ of the dimension in the vehicle width direction of the bumper beam 2 away from the end part in the vehicle width direction thereof. This location is a location where the bumper beam 2 does not set back even in case of a collision when a load is concentrated on the central part of the bumper beam 2. Accordingly, no gap in the vehicle front-rear direction develops between the bumper beam 2 and the energy absorption member 6. The bumper beam 2 and the energy absorption member 6 are relatively greatly curved in the vicinity of the region P. The first energy absorption structure in the vehicle front part structure 1 includes the vertical displacement preventing portion in each region P and can therefore properly prevent the displacement of the energy absorption member 6 in the up-down direction relative to the bumper beam 2, thereby appropriately absorbing the collision load (energy).

A pair of upper and lower flange portions 15 are formed on the rear wall portion 10. The upper flange portion 15 extends rearward from an upper edge part of the rear wall portion 10 and is located above the upper wall portion 2a of the bumper beam 2. The lower flange portion 15 extends rearward from a lower edge part of the rear wall portion 10 and is located below the lower wall portion 2g of the bumper beam 2.

The lower flange portion 15 comes into contact with a lower surface of the bumper beam 2, that is, the lower wall portion 2g at a portion (at least in the region P in this embodiment) between the central part in the vehicle width direction and the end part in the vehicle width direction of the bumper beam 2. As described above, each flange portion functions as another vertical displacement preventing portion that prevents the displacement between the energy absorption member 6 and the bumper beam 2 in the up-down direction. The flange portion 15 also functions as a reinforcing portion that reinforces the rear wall portion 10.

The upper flange portion 15 and the upper wall portion 2a of the bumper beam 2 are fixed to each other between the end part in the vehicle width direction of the bumper beam 2 and the hole portion 2b1 on the end part side by means of bolt fastening and the like.

Likewise, the lower flange portion 15 and the lower wall portion 2g of the bumper beam 2 are fixed to each other between the end part in the vehicle width direction of the bumper beam 2 and the hole portion 2f1 on the end part side by means of bolt fastening and the like.

<<Tube Compressing Portion>>

As shown in FIG. 2, the tube compressing portion 20 is a region located in front of the pressure generation tube 4 and configured not to compress the pressure generation tube 4 in normal times and to compress the pressure generation tube 4 in cooperation with the rear wall portion 10 in case of a collision (a front collision) of the vehicle. The tube compressing portion 20 includes an extension wall portion 21 that extends in the front-rear direction, a front wall portion 22 that extends downward from a front end part of the extension wall portion 21, an opposite wall portion 23 that extends downward from the vicinity of the front end part of the extension wall portion 21 in such a way as to be opposed to the front wall portion 22, and a compressing wall portion 24 that extends downward from the vicinity of a rear end part of the extension wall portion 21, which are integrated together. The extension wall portion 21 extends from a constant height position across the entire rear wall portion 10 in the vehicle width direction, and takes on an arch shape that projects forward in plan view as with the rear wall portion 10. Specifically, the extension wall portion 21 takes on such a shape that its central part in the vehicle width direction is located foremost and its two end parts in the vehicle width direction gradually set back.

Figure 4:
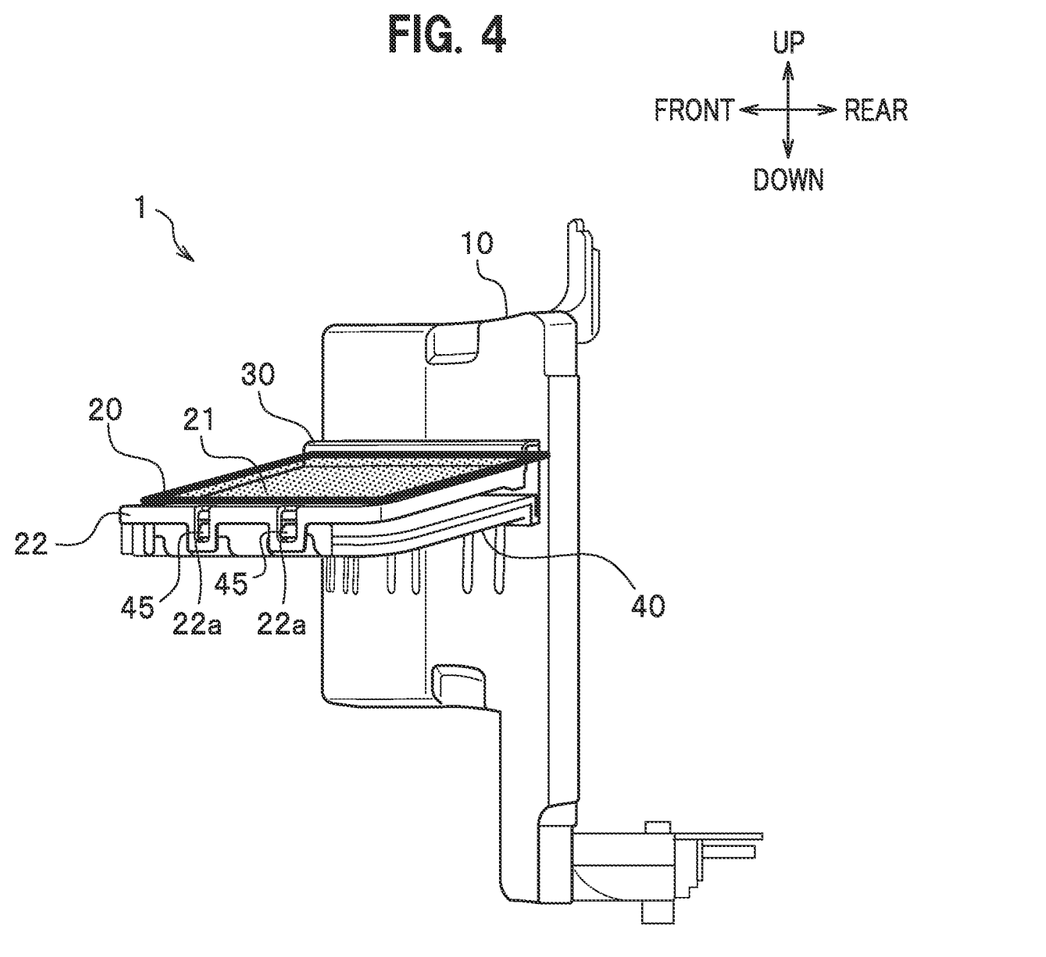
FIG. 4 is a side view schematically showing an assembly of an energy absorption member and a reinforcement member.

In this embodiment, the extension wall portion 21 is an elongated plate portion which is inclined downward toward the front. Specifically, the front end part (an apical end part) of the extension wall portion 21 is located below the rear end part (a base end part) of the extension wall portion 21. That is to say, the front end part of the extension wall portion 21 is offset toward the pressure generation tube 4 in the up-down direction relative to the base end part of the extension wall portion 21. Meanwhile, the extension wall portion 21 is formed in a bent manner in such a way as to project downward in lateral view. Since the extension wall portion 21 extends obliquely downward from the rear wall portion 10 which takes on the arch shape that projects forward in plan view as described above, the contour (which is highlighted with a thick frame) of the extension wall portion 21 takes on a substantially parallelogram shape in lateral view as illustrated in FIG. 4.

As shown in FIG. 2, the front wall portion 22 is provided with a hole portion 22a. A lock portion 45 of the reinforcement member 40 to be described later is locked with a peripheral part of the hole portion 22a. A length (a dimension in the up-down direction) of the opposite wall portion 23 is set shorter than that of the front wall portion 22. The lock portion 45 of the reinforcement member 40 to be described later comes into contact with this opposite wall portion 23. The compressing wall portion 24 is provided at a position away by the diameter of the pressure generation tube 4 from the rear wall portion 10.

<<Hinge Portion>>

The hinge portion 30 connects the rear end part (the base end part of the extension wall portion 21 of the tube compressing portion 20 turnably to the rear wall portion 10 at a position above the pressure generation tube 4. The hinge portion 30 includes an upper wall portion (a first wall portion) 31 that extends forward from the rear wall portion 10 and a front wall portion (a second wall portion) 32 that extends downward from a front end part of the upper wall portion 31, which are integrated together. A lower end part of the front wall portion 32 is connected to the rear end part of the extension wall portion 21 of the tube compressing portion 20.

<Reinforcement Member>

The reinforcement member 40 is a resin member (made of polypropylene (PP), for example), which is provided in such a way as to face the extension wall portion 21 of the tube compressing portion 20 and designed to hold the pressure generation tube 4 in cooperation with the extension wall portion 21. The reinforcement member 40 is formed by injection molding, for instance, and is rigid enough for not causing a delay in detecting a collision as with the tube compressing portion 20. The reinforcement member 40 includes an extension wall portion 41 that extends in the front-rear direction, an intermediate piece portion 42 that extends downward from a lower end part of the extension wall portion 41, a lower piece portion 43 that extends rearward from a lower end part of the intermediate piece portion 42, a rear piece portion 44 that extends upward from a rear end part of the lower piece portion 43, and the lock portion 45 that extends upward from a front end part of the extension wall portion 41, which are integrated together.

The intermediate piece portion 42 and the lower piece portion 43 collectively serve as a hinge portion for the extension wall portion 41 having a similar function to that of the hinge portion 30. The hole portion 44a that takes on a rectangular shape is formed in the rear piece portion 44. The lock portion 12 of the rear wall portion 10 is locked with the peripheral part of the hole portion 44a. Specifically, the reinforcement member 40 is locked with a rear side of the rear wall portion 10 on a front side of the concave portion (inside the concave portion) of the bumper beam 2. The lock portion 45 takes on a claw shape which is lockable with the peripheral part of the hole portion 22a.

<Attachment of Reinforcement Member to Energy Absorption Member>

A worker attaches the reinforcement member 40 to the energy absorption member 6 while locating the pressure generation tube 4 between the rear wall portion 10 and the compressing wall portion 24 of the energy absorption member 6. Here, the worker inserts the rear piece portion 44 of the reinforcement member 40 into the hole portion 11 of the rear wall portion 10 from forward and locks the lock portion 12 of the rear wall portion 10 with the hole portion 44a of the rear piece portion 44. Likewise, the worker brings the lock portion 45 of the reinforcement member 40 into contact with the opposite wall portion 23 and locks the lock portion 45 with the hole portion 22a of the front wall portion 22.

Here, when the rear piece portion 44 is inserted into the hole portion 11, the fall preventing portion 13 is elastically deformed in such a way as to set back, thereby allowing the insertion of the rear piece portion 44 into the hole portion 11. Meanwhile, after the lock portion 12 is locked with the hole portion 44a, the fall preventing portion 13 prevents the rear piece portion 44 from falling off the rear wall portion 10.

<Attachment of Energy Absorption Member to Bumper Beam>

Subsequently, the worker attaches an assembly of the pressure generation tube 4, the energy absorption member 6, and the reinforcement member 40 to the bumper beam 2. Here, the worker establishes positioning of the energy absorption member 6 relative to the bumper beam 2 by inserting the projections 14 of the energy absorption member 6 into the hole portions 2b1 and 2f1 of the bumper beam 2. Then, the worker fixes the positioned bumper beam 2 and the positioned energy absorption member 6 to each other by means of bolt fastening and the like.

<Compression of Pressure Generation Tube in Case of Collision>

Figure 5:
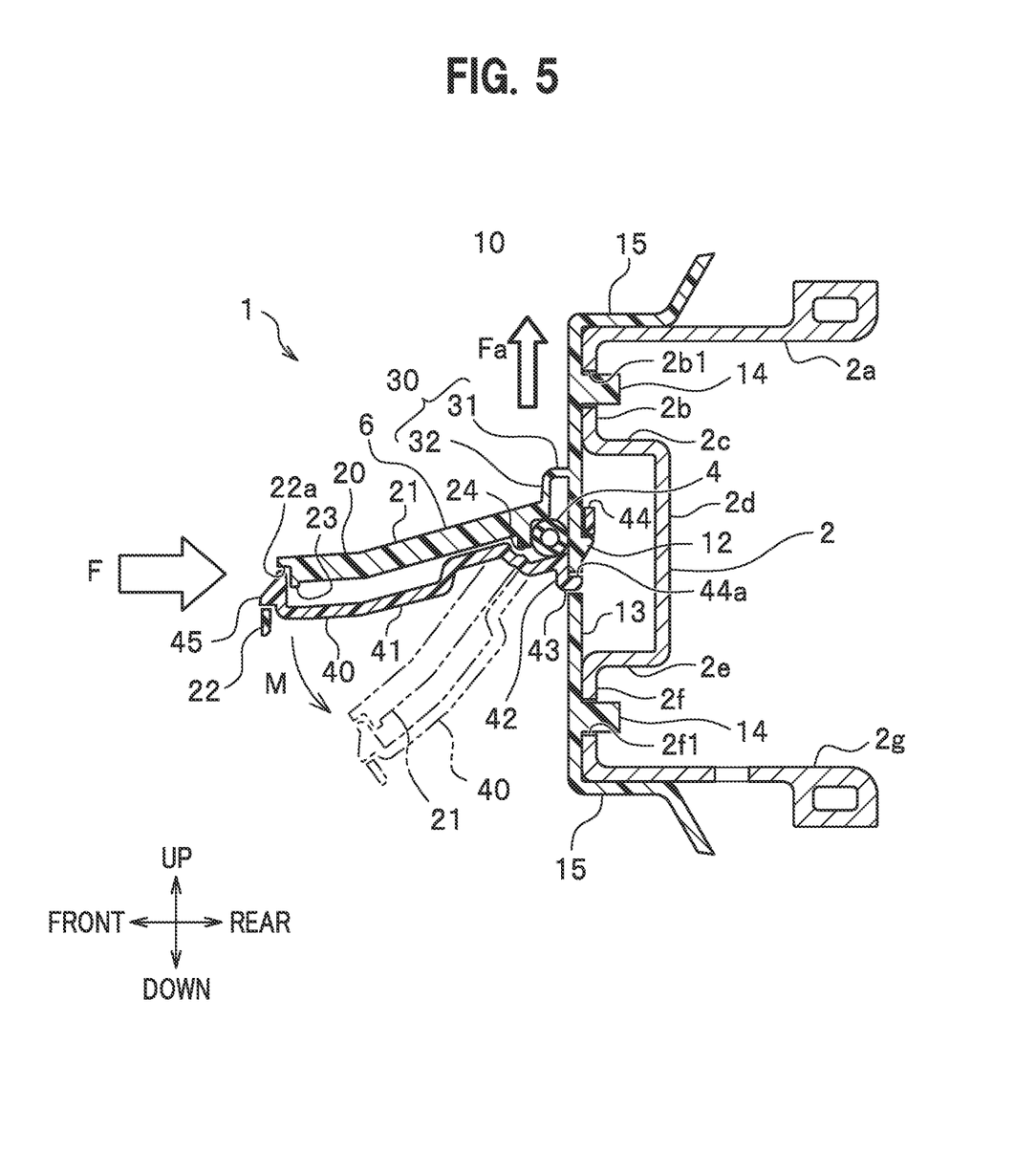
FIG. 5 is a cross-sectional view schematically showing an operation example of a second energy absorption structure according to the embodiment of the present invention.

As shown in FIG. 5, a front collision load F acts on the extension wall portion 21 of the tube compressing portion 20 in case of a collision (a front collision) of the vehicle as a downward turning moment M around the hinge portion 30 (a region of connection between the upper wall portion 31 and the front wall portion 32 in particular). Likewise, the front collision load F acts on the extension wall portion 41 of the reinforcement member 40 as a downward turning moment M around the base end part of the extension wall portion 41 (a region of connection between the extension wall portion 41 and the intermediate piece portion 42). By using these moments M, the compressing wall portion 24 of the tube compressing portion 20 interposes the pressure generation tube 4 between the compressing wall portion 24 and the rear wall portion 10 and compresses the pressure generation tube 4 rearward in such a way as to squash the pressure generation tube 4. In the meantime, the extension wall portion 41 having a contour that takes on a substantially parallelogram shape in lateral view develops an out-of-plane deformation due to the front collision load F.

Here, a length in the front-rear direction of the extension wall portion 41 of the reinforcement member 40 is set larger than a length in the front-rear direction of the extension wall portion 21 of the tube compressing portion 20. Meanwhile, the region of connection between the upper wall portion 31 and the front wall portion 32 serves as the center of rotation of the extension wall portion 21 while the region of connection between the extension wall portion 41 and the intermediate piece portion 42 serves as the center of rotation of the extension wall portion 41. The center of rotation of the extension wall portion 41 is located immediately below the pressure generation tube 4 and behind the center of rotation of the extension wall portion 21. For this reason, when the extension wall portions 21 and 41 are turned downward, the front end parts of the extension wall portions 21 and 41 come close to each other. Thus, the extension wall portions 21 and 41 can be prevented from being unlocked. Moreover, since the lock portion 45 is locked with the front wall portion 22 from behind, the reinforcement member 40 has a structure that is less likely to be detached from the extension wall portion 21 when the extension wall portion 21 is deformed in a turned manner.

In the meantime, an upward force Fa acts on the rear wall portion 10 when the extension wall portion 21 is turned downward. Here, the lower flange portion 15 is in contact from below with the lower wall portion 2g of the bumper beam 2, thus functioning as the vertical displacement preventing portion that prevents the energy absorption member 6 from being displaced in the up-down direction from the bumper beam 2.

Figure 6:
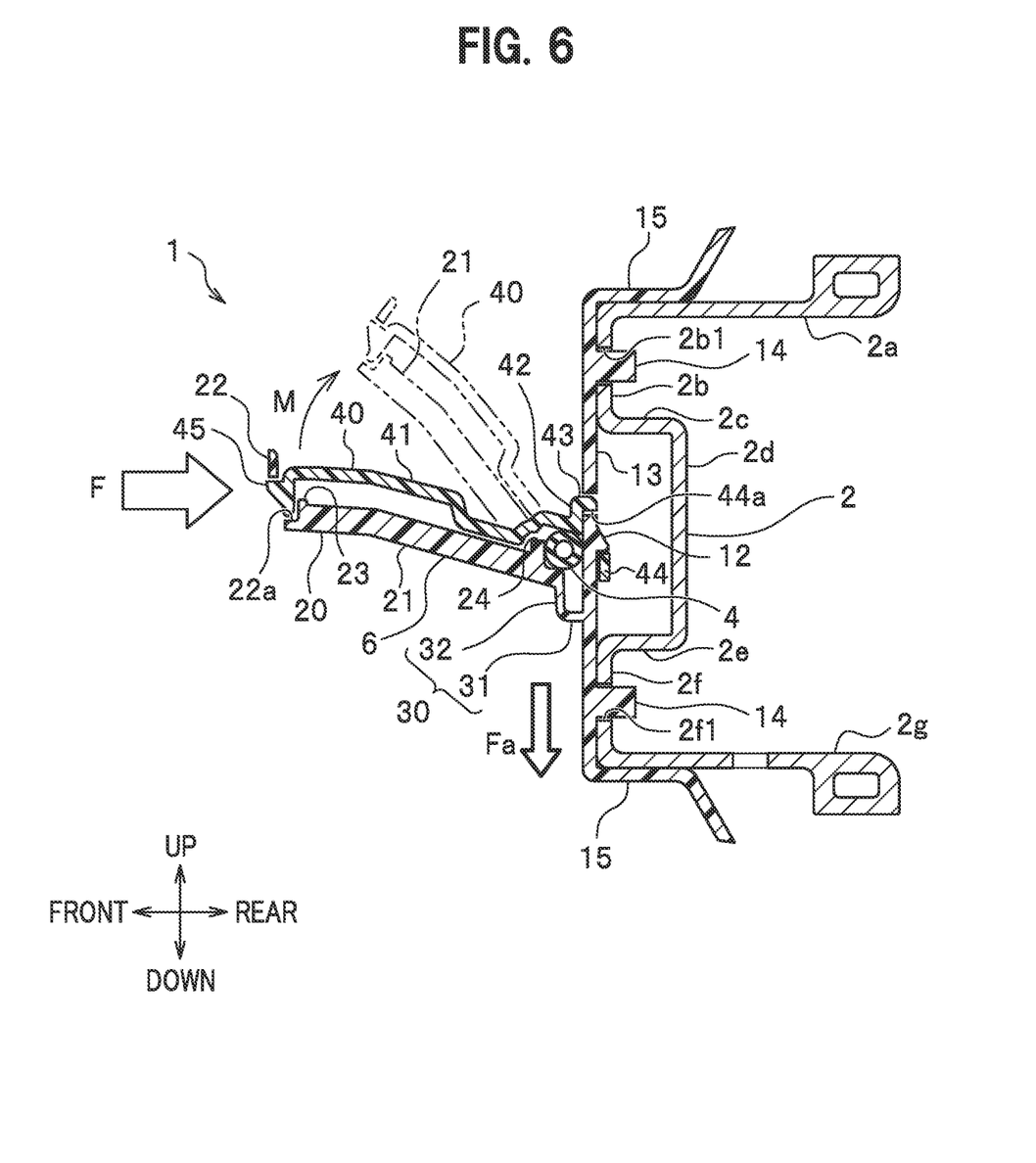
FIG. 6 is a cross-sectional view schematically showing another operation example of the second energy absorption structure according to the embodiment of the present invention.

Note that the first energy absorption structure in the vehicle front part structure 1 may have such a structure that the energy absorption member 6 and the reinforcement member 40 are turned upside down as shown in FIG. 6. In this case, a downward force Fa acts on the rear wall portion 10 when the extension wall portion 21 is turned upward. Here, the upper flange portion 15 is in contact from above with the upper wall portion 2a of the bumper beam 2, thus functioning as the vertical displacement preventing portion that prevents the energy absorption member 6 from being displaced in the up-down direction from the bumper beam 2.

The energy absorption member 6 according to the embodiment of the present invention includes the plate-shaped rear wall portion 10 that extends in the vehicle width direction, and the extension wall portion 21 that extends in the vehicle width direction and extends forward from the intermediate part 10a in the height direction of the rear wall portion 10. The rear wall portion 10 takes on the arch shape that projects forward in plan view. The extension wall portion 21 is inclined downward or upward from a rear end part toward a front end part.

Therefore, the energy absorption member 6 is capable of increasing an amount of energy absorption by causing the extension wall portion 21 to develop the out-of-plane deformation in case of a front collision, and thus reducing the dimension in the front-rear direction while securing the amount of energy absorption in case of the front collision.

Here, when a colliding object collides with the extension wall portion 21 in the vicinity of the central part in the vehicle width direction thereof, an amount of displacement in the front-rear direction of the extension wall portion 21 is not constant in terms of the vehicle width direction but is increased in the vicinity of the colliding region and decreased gradually in a lateral direction (toward the end part in the vehicle width direction). For this reason, a ridge line of a portion of the extension wall portion 21 deformed by the collision takes on a substantially arc shape. This is due to the following reason. Specifically, since the shapes of the rear wall portion 10 and the extension wall portion 21 that extends forward from the rear wall portion 10 take on the arch shape in plan view, the rigidity of the end part in the vehicle width direction of the extension wall portion 21 is higher than the rigidity of the central part thereof. Accordingly, when the colliding object collides with the extension wall portion 21 in the vicinity of the central part in the vehicle width direction, a distortion occurs between the central part of the extension wall portion 21 and the end part in the vehicle direction thereof, and the extension wall portion 21 develops the out-of-plane deformation. In this way, it is possible to increase the amount of energy absorption in case of the front collision.

Further, the energy absorption member 6 has the feature that the outline of the extension wall portion 2 is substantially formed to be parallelogram in a side view.

Therefore, the energy absorption member 6 is capable of increasing an amount of energy absorption by causing the extension wall portion 21 to preferably develop the out-of-plane deformation in case of a front collision.

Further, the first energy absorption structure according to an embodiment of the present invention includes the energy absorption member 6, a bumper beam 2 which is provided to a rear side of the energy absorption member 6; and a vertical displacement preventing portion arranged between an end of the bumper beam 2 and a center part of the bumper beam 2 in the vehicle width direction, the vertical displacement preventing portion preventing a displacement of the energy absorption member 6 and the bumper beam 2 in a vertical direction.

In accordance with this feature, the first energy absorption structure according to the embodiment of the present invention makes it possible to prevent the energy absorption member 6 from being displaced in the up-down direction from the bumper beam 2, whereby the extension wall portion 21 is preferably deformed to absorb the energy.

Further, the first energy absorption structure according to the embodiment of the present invention makes it possible to preferably prevent the energy absorption member 6 from being displaced in the up-down direction from the bumper beam 2, since the vertical displacement preventing portion is arranged in a position of the bumper beam 2 and the energy absorption member 6 where the surfaces of the bumper beam 2 and the energy absorption member 6 will not be receded even if a concentrated load is applied to the center part of the bumper beam 2 in the vehicle width direction.

Further the first energy absorption structure has the feature that the vertical displacement preventing portion is provided at a position of the bumper beam 2 which is quarter of a length of the bumper beam 2 in the vehicle width direction from an end of the bumper beam2.

In accordance with this feature, the first energy absorption structure makes it possible to preferably prevent the energy absorption member 6 from being displaced from the bumper beam 2 in the up-down direction, whereby the collision load (energy) is preferably absorbed.

Furthermore, the first energy absorption structure has the feature that the vertical displacement preventing portion includes a hole portion 2b1, 2f1 formed in the bumper beam 2; and a projection 14 which projects rearward from the rear wall portion 10, and wherein the projection 14 is penetrated through the hole portion 2b1, 2f1.

In accordance with this feature, the first energy absorption structure makes it possible to realize the vertical displacement preventing portion with a simple and low weight structure in low cost.

Yet further, the energy absorption structure has the feature that the hole portion 2b1, 2f1 and the projection 14 constitute a positioning portion for positioning the energy absorption member 6 and the bumper beam 2 when the energy absorption member 6 and the bumper beam 2 are assembled.

In accordance with this feature, the first energy absorption structure makes it possible to improve the arrangement flexibility of parts of the energy absorption structure with low cost and decreased weight compared with a structure in which a positioning portion is provided as another member.

Further, the first energy absorption structure has the feature that the vertical displacement preventing portion is a flange portion 15 which extends rearward from the rear wall portion 10, wherein the flange portion 15 is in contact with a lower surface of the bumper beam 2 when the extension wall portion 21 is inclined downward from its rear end to its front end, and wherein the flange portion 15 is in contact with an upper surface of the bumper beam 2 when the extension wall portion is inclined upward from its rear end to its front end.

In accordance with this feature, the first energy absorption structure makes it possible to realize the vertical displacement preventing portion without making any special work in the bumper beam2, whereby the cost for manufacturing the first energy absorption structure is decreased.

Furthermore, the first energy absorption structure has the feature that the flange portion 15 is a reinforce portion which reinforces the rear wall portion 10.

In accordance with this feature, the energy absorption structure makes it possible to improve the arrangement flexibility of parts of the energy absorption structure with low cost and decreased weight compared with a structure in which a reinforce portion is provided as another member.

Furthermore, a second energy absorption structure of the present invention includes the energy absorption member 6; and a reinforcing member 40 which is opposed to the extension wall portion 21, wherein the reinforcing member 40 is engaged with the energy absorption member 6.

In accordance with this feature, the second energy absorption structure makes it possible to absorb a greater energy by the combination of the extension wall portion 21 and the reinforcing member 40.

Yet further, the second energy absorption structure has the feature that the energy absorption member 6 includes a front wall portion 22 which extends upward or downward from a front end of the extension wall portion 21, and the reinforcing member 40 is rearwardly engaged with the front wall portion 22.

In accordance with this feature, the second energy absorption structure makes it possible to preferably prevent the reinforcing member 40 from being separated by the deformation of the extension wall portion 21.

Further, the second energy absorption structure includes a pressure generation tube which is held by the rear wall portion 10, the extension wall portion 21 and the reinforcing member 40.

In accordance with this feature, the second energy absorption structure makes it possible to deform the pressure generation tube held by the rear wall portion 10, the extension wall portion 21 and the reinforcing member 40 with a front collision load to preferably detect the front collision.

Furthermore, the second energy absorption structure includes a bumper beam 2 which is provided to a rear side of the energy absorption member 6, wherein the bumper beam 2 includes a recessed portion which extends in the vehicle width direction and is recessed rearward, and the reinforcing member 40 is engaged with the rear wall portion 10 in front of the recessed portion.

In accordance with this feature, the second energy absorption structure makes it possible to improve the strength and rigidity of the bumper beam 2 and also to prevent the engagement portions of the reinforcing member 40 and the rear wall portion 10 from being interfered with the bumper beam 2.

The embodiment of the present invention has been described above in detail. It is to be noted, however, that the present invention is not limited only to the above-described embodiment and various changes are possible within the range not departing from the scope of the present invention.

For example, the absorption amount of the front collision load (energy) can be arbitrarily set based on adjustment of the attachment angles and strength of the rear wall portion 10 and the extension wall part 21 (e.g. plate thickness, material and addition of reinforcement (e.g. ribs)).

What is claimed is:

1. An energy absorption member comprising:
    a plate shaped rear wall portion which extends in a vehicle width direction; and
    an extension wall portion of a tube compressing portion that extends in the vehicle width direction and extends forward from an intermediate part in a height direction of the rear wall portion; wherein
    the rear wall portion takes on an arch shape that projects forward in a plan view, and the extension wall portion of the tube compressing portion is inclined downward or upward from its rear end part toward its front end part.

2. The energy absorption member according to claim 1, wherein an outline of the extension wall portion of the tube compressing portion takes on a substantially parallelogram shape in a lateral view.

3. An energy absorption structure comprising:
    an energy absorption member comprising: a plate shaped rear wall portion which extends in a vehicle width direction; and an extension wall portion of a tube compressing portion that extends in the vehicle width direction and extends forward from an intermediate part in a height direction of the rear wall portion, wherein the rear wall portion takes on an arch shape that projects forward in a plan view, and the extension wall portion of the tube compressing portion is inclined downward or upward from its rear end past toward its front end part;
    a bumper beam which is provided to a rear side of the energy absorption member; and
    a vertical displacement preventing portion formed as a flange portion in contact with a wall portion of the bumper beam,
    wherein the vertical displacement preventing portion is disposed between an end of the bumper beam and a center part of the bumper beam in the vehicle width direction, the vertical displacement preventing portion preventing a displacement of the energy absorption member and the bumper beam in a vertical direction.

4. The energy absorption structure according to claim 3, wherein the vertical displacement preventing portion is provided at a position of the bumper beam which is quarter of a length of the bumper beam in the vehicle width direction from an end of the bumper beam.

5. The energy absorption structure according to claim 3, wherein the vertical displacement preventing portion includes a hole portion formed in the bumper beam; and a projection which projects rearward from the rear wall portion, and wherein the projection is penetrated through the hole portion.

6. The energy absorption structure according to claim 5, wherein the hole portion and the projection constitute a positioning portion for positioning the energy absorption member and the bumper beam when the energy absorption member and the bumper beam are assembled.

7. The energy absorption structure according to claim 3, wherein the flange portion comprises first and second flange portions which extend rearward from the rear wall portion, wherein the first flange portion is in contact with a lower surface of the bumper beam when the extension wall portion of the tube compressing portion is inclined downward from its rear end to its front end, and the second flange portion is in contact with an upper surface of the bumper beam when the extension wall portion of the tube compressing portion is inclined upward from its rear end to its front end.

8. The energy absorption structure according to claim 7, wherein the flange portion reinforces the rear wall portion.

9. An energy absorption structure comprising:
    an energy absorption member comprising: a plate shaped rear wall portion which extends in a vehicle width direction; and an extension wall portion of a tube compressing portion that extends in the vehicle width direction and extends forward from an intermediate part in a height direction of the rear wall portion, wherein the rear wall portion takes on an arch shape that projects forward in a plan view, and the extension wall portion of the tube compressing portion is inclined downward or upward from its rear end past toward its front end part; and
    a reinforcing member which is opposed to the extension wall portion of the tube compressing portion,
    wherein the reinforcing member is engaged with the energy absorption member.

10. The energy absorption structure according to claim 9, wherein the energy absorption member includes a front wall portion which extends upward or downward from a front end of the extension wall portion of the tube compressing portion, and the reinforcing member is rearwardly engaged with the front wall portion.

11. The energy absorption structure according to claim 9, further comprising a pressure generation tube which is held by the rear wall portion, the extension wall portion of the tube compressing portion and the reinforcing member.

12. The energy absorption structure according to claim 9, further comprising a bumper beam which is provided to a rear side of the energy absorption member, wherein the bumper beam includes a recessed portion which extends in the vehicle width direction and is recessed rearward, and the reinforcing member is engaged with the rear wall portion in front of the recessed portion.

* * * * *